(12) United States Patent
Ogata et al.

(10) Patent No.: US 10,553,862 B2
(45) Date of Patent: Feb. 4, 2020

(54) POSITIVE ELECTRODE ACTIVE MATERIAL FOR SECONDARY BATTERY AND SECONDARY BATTERY

(71) Applicant: PANASONIC INTELLECTUAL PROPERTY MANAGEMENT CO., LTD., Osaka-shi, Osaka (JP)

(72) Inventors: Atsushi Ogata, Osaka (JP); Takao Kokubu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/979,716

(22) Filed: May 15, 2018

(65) Prior Publication Data

US 2018/0261835 A1 Sep. 13, 2018

Related U.S. Application Data

(63) Continuation of application No. PCT/JP2016/004415, filed on Sep. 30, 2016.

(30) Foreign Application Priority Data

Dec. 11, 2015 (JP) .................. 2015-242232

(51) Int. Cl.
*H01M 4/525* (2010.01)
*H01M 4/36* (2006.01)
(Continued)

(52) U.S. Cl.
CPC .......... *H01M 4/366* (2013.01); *C01B 35/121* (2013.01); *C01G 53/50* (2013.01); *H01M 4/505* (2013.01);
(Continued)

(58) Field of Classification Search
CPC ...... H01M 4/366; H01M 4/485; H01M 4/505; H01M 10/0525; H01M 4/525;
(Continued)

(56) References Cited

U.S. PATENT DOCUMENTS

2010/0209771 A1* 8/2010 Shizuka ................ B82Y 30/00
429/207
2011/0315918 A1 12/2011 Kawai et al.
(Continued)

FOREIGN PATENT DOCUMENTS

JP  2011-228292 A  11/2011
JP  2012-28313 A  2/2012
(Continued)

OTHER PUBLICATIONS

International Search Report dated Nov. 29, 2016, issued in Counterpart of International Application No. PCT/JP2016/004415 (2 pages).

*Primary Examiner* — Wojciech Haske

(74) *Attorney, Agent, or Firm* — Westerman, Hattori, Daniels & Adrian, LLP

(57) ABSTRACT

A positive electrode active material for a secondary battery contains second particles which are produced by aggregation of primary particles of a lithium transition metal oxide containing Ni and W, and a boron compound present inside and on the surfaces of the secondary particles.

4 Claims, 2 Drawing Sheets

(51) Int. Cl.
    *C01B 35/12*     (2006.01)
    *C01G 53/00*     (2006.01)
    *H01M 4/505*     (2010.01)
    *H01M 10/0525*     (2010.01)
    *H01M 4/02*     (2006.01)

(52) U.S. Cl.
    CPC ....... *H01M 4/525* (2013.01); *H01M 10/0525* (2013.01); *C01P 2004/50* (2013.01); *C01P 2006/40* (2013.01); *H01M 2004/028* (2013.01)

(58) Field of Classification Search
    CPC ........... H01M 2004/028; C01G 53/006; C01G 53/50; C01B 35/121; C01P 2004/84; C01P 2002/50; C01P 2002/52; C01P 2004/50; C01P 2006/40
    See application file for complete search history.

(56) References Cited

U.S. PATENT DOCUMENTS

2013/0029216 A1    1/2013  Kim et al.
2014/0205901 A1    7/2014  Nagai et al.

FOREIGN PATENT DOCUMENTS

| JP | 2012-136419 A | 7/2012 |
| JP | 2012-216476 A | 11/2012 |
| JP | 2013-93171 A | 5/2013 |
| JP | 2013-206843 A | 10/2013 |
| WO | 2013/031478 A1 | 3/2013 |

\* cited by examiner

POSITIVE ELECTRODE ACTIVE MATERIAL FOR SECONDARY BATTERY AND SECONDARY BATTERY

TECHNICAL FIELD

The present disclosure relates to a technique for a positive electrode active material for a secondary battery and a secondary battery.

BACKGROUND ART

A technique of mixing a positive electrode active material containing W (tungsten) with boric acid particles (for example, refer to Patent Literature 1) and the like have been proposed as a technique for improving an increase in direct-current internal resistance (DC-IR) of batteries at a low temperature.

CITATION LIST

Patent Literature

PTL 1: Japanese Published Unexamined Patent Application No. 2012-028313

SUMMARY OF INVENTION

However, the technique disclosed in Patent Literature 1 has the problem of causing a decrease in input characteristics due to high-rate charge-discharge cycles.

Accordingly, an object of the present disclosure is to provide a positive electrode active material for a secondary battery which is capable of suppressing a decrease in input characteristics due to high-rate charge-discharge cycles and also provide a secondary battery using the positive electrode active material.

In an aspect of the present disclosure, a positive electrode active material for a secondary battery contains secondary particles which are produced by aggregation of primary particles of a lithium transition metal oxide containing Ni and W, and a boron compound present inside and on the surfaces of the secondary particles.

According to an aspect of the present disclosure, a decrease in input characteristics due to high-rate charge-discharge cycles can be suppressed.

Figure 1:
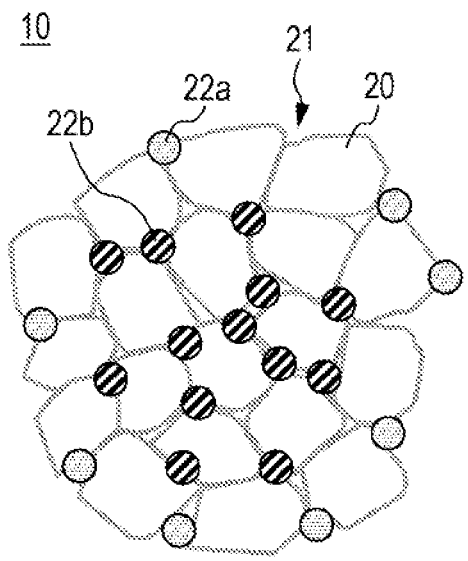
FIG. 1 is a schematic sectional view of a positive electrode active material particle according to an embodiment of the present disclosure.

DESCRIPTION OF EMBODIMENTS (Knowledge as Basis of the Present Disclosure)

In general, in a secondary battery using, as a positive electrode active material, a lithium transition metal oxide containing Ni, high-rate charge-discharge cycles cause structural deterioration due to changes in volume and crystal structure of the positive electrode active material or the like, deterioration of a positive electrode material surface due to side-reaction at an interface between the positive electrode active material and an electrolyte, or the like. This leads to the problem of increasing the resistance of the positive electrode active material, thereby decreasing the input characteristics of the battery. As a result of earnest research, the inventors found that the effect of suppressing a decrease in input characteristics due to high-rate charge-discharge cycles can be obtained by combining W (tungsten) and B (boron) as elements added to a positive electrode active material.

According to an embodiment of the present disclosure, a positive electrode active material for a nonaqueous electrolyte secondary battery contains secondary particles which are produced by aggregation of primary particles of a lithium transition metal oxide containing Ni and W, and a boron compound present inside and on the surfaces of the secondary particles. The positive electrode active material for a nonaqueous electrolyte secondary battery according to the embodiment of the present disclosure is capable of suppressing a decrease in input characteristics due to high-rate charge-discharge cycles. For example, a decrease in input characteristics due to charge-discharge cycles with 500 mA or more can be suppressed, depending on the rated capacity of a secondary battery or the like.

Although the mechanism of this effect is not sufficiently made clear, it is considered as follows. It is considered that when boron elements are present inside and on the surfaces of the secondary particles, side reaction between the surface of the positive electrode active material and an electrolyte solution is suppressed, thereby suppressing a decrease in activity of the positive electrode active material. When boron is not present inside the secondary particles, deterioration is advanced by a change in surface form and a change in crystal structure in association with elution of a transition metal on primary particles in the secondary particles, and thus the effect of suppressing the side reaction cannot be satisfactorily obtained. Also, when the positive electrode active material contains tungsten, the structure of the positive electrode active material is stabilized, and thus the collapse of the secondary particles due to high-rate charge-discharge cycles is suppressed. It is thus considered that the electric contact (electric contact between primary particles) in the secondary particles is maintained, and the occurrence of new surfaces in the secondary particles is suppressed. It is difficult that the side reaction between the electrolyte solution and the new surfaces formed in the secondary particles by high-rate charge-discharge cycles is suppressed by only the presence of boron inside and on the surfaces of the secondary particles. However, it is considered that the side reaction between the electrolyte solution and the new surfaces in the secondary particles is also suppressed by combination with tungsten contained in the positive electrode active material. Therefore, a decrease in input characteristics due to high-rate charge-discharge cycles is considered to be suppressed.

In a positive electrode active material for a nonaqueous electrolyte secondary battery according to another embodiment of the present disclosure, for example, the ratio of W in a lithium transition metal oxide is over 0 mol % and 1 mol % or less relative to the total molar amount of metal elements, excluding Li, in the lithium transition metal oxide. This makes it possible to further suppress a decrease in input characteristics due to high-rate charge-discharge cycles while maintaining a discharge capacity as compared with the case not satisfying the range.

In a positive electrode active material for a nonaqueous electrolyte secondary battery according to a further embodiment of the present disclosure, for example, the ratio of boron elements in secondary particles is within a range of 5% by mass to 60% by mass relative to the total amount of boron elements inside and on the surfaces of the secondary particles. This makes it possible to further suppress a decrease in input characteristics due to high-rate charge-discharge cycles while maintaining a discharge capacity as compared with the case not satisfying the range.

An example of a nonaqueous electrolyte secondary battery using a positive electrode active material according to an embodiment of the present disclosure is described below. The drawings referred to in the description of embodiments are schematically shown, and the dimension ratios and the like of components shown in the drawings may be different from actual ones. Specific dimension ratios and the like should be understood by taking into consideration the description below.

A nonaqueous electrolyte secondary battery as an example of the embodiment includes a negative electrode, a positive electrode, and a nonaqueous electrolyte containing a nonaqueous solvent. In addition, a separator is preferably provided between the positive electrode and the negative electrode. An example of the structure of the nonaqueous electrolyte secondary battery is a structure in which an electrode body formed by winding the positive electrode and the negative electrode through the separator and the nonaqueous electrolyte are housed in an outer casing. Instead of the wound electrode assembly, an electrode body of another form, such as a laminated electrode body formed by laminating a positive electrode and a negative electrode through a separator or the like, may be applied. The nonaqueous electrolyte secondary battery may have any one of a cylindrical shape, a square shape, a coin shape, a button shape, a laminate shape, and the like.

<Positive Electrode>

The positive electrode includes a positive electrode current collector such as, for example, a metal foil or the like, and a positive electrode mixture layer formed on the positive electrode current collector. A foil of a metal which is stable within the potential range of the positive electrode, such as aluminum or the like, a film having a surface layer which contains the metal, or the like can be used as the positive electrode current collector. The positive electrode mixture layer preferably contains the positive electrode active material for a nonaqueous electrolyte secondary battery, and further contains a conductive material and a binder material.

FIG. 1 is a schematic sectional view of a positive electrode active material particle according to an embodiment of the present disclosure. As shown in FIG. 1, a positive electrode active material particle 10 includes a secondary particle 21 of a lithium transition metal oxide containing Ni and W formed by aggregation of primary particles 20 of the lithium transition metal oxide containing Ni and W, a boron compound 22a present on the surface of the secondary particle 21, and a boron compound 22b present inside the secondary particle 21.

The boron compound 22a present on the surface of the secondary particle 21 shown in FIG. 1 is dispersed in the particle form of a primary particle or secondary particle on the surface of the secondary particle 21. The boron compound 22b present inside the secondary particle 21 shown in FIG. 1 is dispersed in the particle form of a primary particle or secondary particle in the secondary particle 21. The boron compound (22a, 22b) present on the surface of and inside the secondary particle 21 shown in FIG. 1 is in a non-solid solution state not dissolved in the lithium transition metal oxide.

The boron compound present inside the secondary particle is not limited to being present in the non-solid solution state not dissolved in the lithium transition metal oxide and may be present in the state of a solid solution of boron elements in the lithium transition metal oxide, that is, the form of the lithium transition metal oxide containing boron elements (B). When the boron compound present inside the secondary particle is at least partially present as a solid solution of boron in the lithium transition metal oxide, the boron compound is in a state of being uniformly dispersed in the secondary particles as compared with, for example, the case where the boron compound present inside the secondary particle is entirely in the state of a solid solution (the boron compound 22b shown in FIG. 1). Therefore, a change in crystal form in association with elution of the transition metals on the surfaces of the primary particles is suppressed, and the crystal structure of the lithium transition metal oxide is stabilized, thereby further suppressing a decrease in input characteristics due to high-rate charge-discharge cycles.

The lithium transition metal oxide containing Ni and W is not particularly limited as long as it is a composite oxide containing Ni, W, and Li, and is represented by, for example, the general formula $Li_{1+x}Ni_aW_bM_cO_{2+d}$ (M is at least one element other than Li, Ni, and W, $0.9<a+b+c\leq1$, $0\leq x\leq0.2$, and $-0.1\leq d\leq0.1$).

In the general formula, M is not particularly limited as long as it is at least one element other than Li, Ni, and W. For example, M is at least one element selected from Co, Mn, Fe, Al, Mg, Ti, Cr, Cu, Ze, Sn Zr, Nb, Mo, Ta, Na, K, Ba, Sr, Bi, Be, and B, or the like, and from the viewpoint of structure stability, at least one elected from Co, Mn, Al, Mg, Zr, and the like is preferably contained, and at least one of Co and Mn is more preferably contained. When the boron compound present inside the secondary particles is present as a solid solution of boron in the lithium transition metal oxide, M in the general formula contains at least B, and from the viewpoint of structure stability or the like, M preferably contains, in addition to B, at least one selected from Co, Mn, Al, Mg, Zr, and the like and particularly preferably contains at least one of Co and Mn.

The ratio of W in the lithium transition metal oxide is, for example, preferably over 0 mol % and 1 mol % or less, and still preferably 0.1 mol % or more and 0.8 mol % or less, and still more preferably 0.3 mol % or more and 0.5 mol % or less relative to the total molar amount of metal elements excluding Li. With the ratio of W satisfying the range, a decrease in discharge capacity is further suppressed as compared with the case of a ratio exceeding 1 mol %.

The ratio of Ni in the lithium transition metal oxide is, for example, preferably 50 mol % or more, more preferably 50 mol % or more and 80 mol % or less, and still more preferably 51 mol % or more and 70 mol % or less relative to the total molar amount of metal elements excluding Li. With increasing Ni content, an attempt to increase the capacity can be made, while thermal stability may be decreased.

As described above, from the viewpoint of stability of the crystal structure, the lithium transition metal oxide particularly preferably contains Co and Mn and is represented by, for example, the general formula $Li_{1+x}Ni_aMn_bCo_cW_dM_eO_{2+f}$ (M is at least one element other than Li, Ni, Co, Mn, and W, $0.9<a+b+c+d+e\leq1$, $0\leq x\leq0.2$, and $-0.1\leq d\leq0.1$).

When the lithium transition metal oxide contains Mn, from the viewpoint of stability of the crystal structure, higher capacity, and the like, a difference between the Ni ratio and the Mn ratio to the total molar amount of metal elements, excluding Li, in the lithium transition metal oxide preferably exceeds 20 mol %, is more preferably 25 mol % or more, and still more preferably 25 mol % or more and 30 mol % or less. Also, from the viewpoint of stability of the crystal structure, higher capacity, and the like, the ratio of Mn to the total molar amount of metal elements, excluding Li, in the lithium transition metal oxide is preferably over 0 mol % and 40 mol % or less, is more preferably 10 mol % or more and 35 mol % or less, and still more preferably 20 mol % or more and 30 mol % or less.

When the lithium transition metal oxide contains Co, from the viewpoint of stability of the crystal structure, higher capacity, and the like, the composition ratio of Co in the lithium transition metal oxide is, for example, preferably over 0 mol % and 40 mol % or less, more preferably 10 mol % or more and 35 mol % or less, and still more preferably 20 mol % or more and 30 mol % or less.

The average particle diameter of the primary particles of the lithium transition metal oxide is preferably 100 nm or more and 5 μm or less and more preferably 300 nm or more and 2 μm or less. With the average particle diameter of less than 100 nm, the amount of interfaces of the primary particles, including those in the secondary particles, is excessively increased, and thus cracking of the primary particles may easily occur due to expansion and contraction of the positive electrode active material during charge-discharge cycles. On the other hand, with the average particle diameter exceeding 5 μm, the amount of interfaces of the primary particles, including those in the secondary particles, is excessively decreased, and thus output may be decreased particularly at a low temperature. The average particle diameter of the secondary particles of the lithium transition metal oxide is preferably 2 μm or more and 40 μm or less and more preferably 4 μm or more and 20 μm or less. With the average particle diameter of less than 2 μm, the excessively small secondary particles causes a decrease in the packing density of the positive electrode active material, and thus a higher capacity cannot be satisfactorily obtained. On the other hand, with the average particle diameter exceeding 40 μm, satisfactory output may not be achieved particularly at a low temperature. Since the secondary particles of the lithium transition metal oxide are formed by aggregation of the primary particles of the lithium transition metal oxide, the primary particles of the lithium transition metal oxide are never larger than the secondary particles of the lithium transition metal oxide.

The average particle diameter is determined by, for example, observing surfaces and sections of several tens of particles each with a scanning electron microscope (SEM) and measuring particles diameters.

In the particles of the positive electrode active material according to an embodiment of the present disclosure, the ratio of boron elements inside the secondary particles relative to the total amount of boron elements on the surfaces of and inside the secondary particles is preferably within a range of 5% by mass or more and 60% by mass or less, more preferably within a range of 9% by mass or more and 53% by mass or less, and still more preferably within a range of 10% by mass or more and 40% by mass or less. The ratio (may be referred to as the "inside boron ratio" hereinafter) of boron elements inside the secondary particles relative to the total amount of boron elements on the surfaces of and inside the secondary particles is determined by the following formula.

$$A\ (\%\ \text{by mass}) = (1 - (B/C)) \times 100$$

A: inside boron ratio, B: amount of surface boron elements in secondary particles, C: amount of surface and inside boron elements in secondary particles The amount of surface boron elements in the secondary particles is a value determined by washing the secondary particles with water for 20 minutes and then measuring the amount of boron eluted into water by inductively coupled plasma ionization (ICP) emission spectrometry. The amount of surface and inside boron elements in the secondary particles is a value determined by dissolving the secondary particles in hydrochloric acid and then measuring the amount of boron in the resultant solution by ICP emission spectrometry.

When the inside boron ratio is within a range of 5% by mass to 60% by mass, Ni elution and side-reaction on the surfaces of the secondary particles are suppressed, and thus a decrease in input characteristics due to high-rate charge-discharge cycles can be more suppressed as compared with the case not satisfying the range.

The total amount of surface and inside boron elements in the secondary particles is preferably within a range of 0.1 mol % or more and 1 mol % or less, more preferably within a range of 0.2 mol % or more and 0.8 mol % or less, and still more preferably within a range of 0.25 mol % or more and 0.7 mol % or less relative to the total molar amount of metal elements, excluding Li, in the lithium transition metal oxide.

Examples of the boron compound present on the surfaces of the secondary particles include boron oxide, boric acid, lithium borate, metaboric acid, lithium metaborate, lithium tetraborate, and the like. Among these boron compounds, lithium borate, lithium metaborate, lithium tetraborate, and the like are preferred from the viewpoint of easy handleability etc. Like with the boron compound present on the surfaces of the secondary particles, examples of the boron compound present in the non-solid solution state in the lithium transition metal oxide in the secondary particles include boron oxide, boric acid, lithium borate, metaboric acid, lithium metaborate, lithium tetraborate, and the like.

The average particle diameter of the boron compound present on the surfaces of the secondary particles is preferably 1 nm or more and 500 nm or less and more preferably 2 nm or more and 100 nm or less. With the average particle diameter of less than 1 nm, the surfaces of the secondary particles may not be sufficiently covered, while with the average particle diameter exceeding 500 nm, electrochemical reaction may be inhibited because the surfaces of the secondary particles are thickly covered with the boron compound. The average particle diameter of the boron compound present in the non-solid solution state in the lithium transition metal oxide in the secondary particles is preferably 1 nm or more and 500 nm or less and more preferably 2 nm or more and 100 nm or less.

An example of a method for producing the positive electrode active material of the present disclosure is described.

A lithium compound, a transition metal oxide containing Ni, a tungsten compound such as tungsten oxide or the like, and a boron compound, which are used as raw materials, are mixed so that the amounts of Ni, W, and B are predetermined amounts in terms of molar ratios to Li atoms, and the resultant mixture is fired at a predetermined temperature to produce a solid solution A. If required, the solid solution A is ground to a predetermined particle diameter. Next, an aqueous solution containing a boron compound is added (sprayed) to the solid solution A under mixing, and the resultant mixture is dried at a predetermined temperature. As a result, positive electrode active material particles are produced, which contain secondary particles produced by aggregation of primary particles of a lithium transition metal oxide containing Ni and W, and the born compound present on the surfaces of and inside the secondary particles. The inside boron ratio can be adjusted by, for example, the amount of the boron compound added for preparing the solid solution A, and the amount of the boron compound allowed to adhere to the surfaces.

Examples of the lithium compound used as a raw material include lithium hydroxide, lithium nitrate, lithium carbonate, lithium chloride, and the like. Examples of the transition metal oxide used as a raw material include hydroxides, nitrates, carbonates, chlorides, and the like of transition metals including Ni. Examples of the tungsten compound used as a raw material include tungsten oxides such as $WO_3$, $WO_2$, $W_2O_3$, and the like. Example of the boron compound used as a raw material include boron oxide, boric acid, lithium borate, metaboric acid, lithium metaborate, lithium tetraborate, and the like.

The use of the lithium transition metal oxide is not limited to single use of the lithium transition metal oxide containing Ni and W and may be combination with another positive electrode active material. Examples of the other positive electrode active material include lithium cobaltate capable of insertion and desorption of lithium ions while maintaining a stable crystal structure, and the like.

The conductive material is used for, for example, enhancing the electric conductivity of the positive electrode mixture layer. Examples of the conductive material include carbon materials such as carbon black, acetylene black, Ketjen black, graphite, and the like. These may be used alone or in combination of two or more.

The binder material is used for maintaining a good contact state between the positive electrode active material and the conductive material and for enhancing the binding property of the positive electrode active material or the like to the surface of the positive electrode current collector. Examples of the binder material include fluorocarbon resins such as polytetrafluoroethylene (PTFE), polyvinylidene fluoride (PVdF), and the like, polyacrylonitrile (PAN), polyimide resins, acrylic resins, polyolefin resins, and the like. These resins may be used in combination with carboxymethyl cellulose (CMC) or a salt thereof (CMC-Na, CMC-K, CMC-$NH_4$, or the like, or a partially neutralized type salt), polyethylene oxide (PEO), or the like. These may be used alone or in combination of two or more.

<Negative Electrode>

The negative electrode preferably includes a negative electrode current collector made of, for example, a metal foil or the like, and a negative electrode mixture layer formed on the negative electrode current collector. A foil of a metal stable within the potential range of the negative electrode, such as copper, or the like, a film having a surface layer containing the metal, or the like can be used for the negative electrode current collector. The negative electrode mixture layer preferably contains a binder and the like in addition to a negative electrode active material.

Examples of the negative electrode active material include carbon materials capable of lithium adsorption and desorption, and metals capable of forming alloys with lithium, and alloy compounds containing the metals. Usable examples of the carbon materials include graphites such as natural graphite, hardly graphitizable carbon, artificial graphite, and the like, cokes, and the like. An examples of the alloy compounds contains at least one metal capable of forming an alloy with lithium. In particular, silicon, tin, and the like are preferred as an element capable of forming an alloy with lithium, and silicon oxide, tin oxide, and the like each of which contains the element bonded to oxygen can also be used. Also, a mixture of any one of the carbon materials and a silicon or tin compound can be used. Although the energy density is decreased, lithium titanate or the like, which has a higher charge-discharge potential versus metal lithium than the carbon material or the like, can also be used as the negative electrode material.

Like with the positive electrode, usable examples of the binder include fluorocarbon resins, PAN, polyimide resins, acrylic resins, polyolefin resins, and the like. When a mixture slurry is prepared by using an aqueous solvent, preferably used is CMC or a salt thereof (CMC-Na, CMC-K, CMC-$NH_4$, or the like, or a partially neutralized type salt), styrene-butadiene rubber (SBR), polyacrylic acid (PAA) or a salt thereof (PAA-Na, PAA-K, or the like, or a partially neutralized type salt), polyvinyl alcohol (PVA), or the like.

<Nonaqueous Electrolyte>

The nonaqueous electrolyte contains a nonaqueous solvent and an electrolyte salt dissolved in the nonaqueous solvent. The nonaqueous electrolyte is not limited to a liquid electrolyte (nonaqueous electrolyte solution) and may be a solid electrolyte using a gel-like polymer or the like. Examples of the nonaqueous solvent which can be used include esters, ethers, nitriles such as acetonitrile and the like, amides such as dimethylformamide and the like, mixed solvents thereof, and the like. The nonaqueous solvent may contain a halogen-substituted product produced by at least partially substituting hydrogens of the solvent with a halogen atom such as fluorine or the like.

Examples of the esters include cyclic carbonate esters such as ethylene carbonate (EC), propylene carbonate (PC), butylene carbonate, and the like, chain carbonate esters such as dimethyl carbonate (DMC), methylethyl carbonate (EMC), diethyl carbonate (DEC), methylpropyl carbonate, ethylpropyl carbonate, methylisopropyl carbonate, and the like, cyclic carboxylate esters such as γ-butyrolactone (GBL), γ-valerolactone (GVL), and the like, chain carboxylate esters such as methyl acetate, ethyl acetate, propyl acetate, methyl propionate (MP), ethyl propionate, γ-butyrolactone, and the like.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineol, crown ethers, and the like, chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, diphenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxyethane, 1,1-diethoxyethane, triethylene glycol dimethyl ether, tetraethylene glycol dimethyl ether, and the like.

Examples of the halogen-substituted produce which is preferably used include fluorinated cyclic carbonate esters such as fluoroethylene carbonate (FEC) and the like, fluorinated chain carbonate esters, fluorinated chain carboxylate esters such as fluoromethyl propionate (FMP) and the like.

The electrolyte salt is preferably a lithium salt. Examples of the lithium salt include borates such as $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ ($1<x<6$, n is 1 or 2), $LiB_{10}Cl_{10}$, LiCl, LiBr, LiI, chloroboran lithium, lithium lower aliphatic carboxylate, $Li_2B_4O_7$, $Li(B(C_2O_4)F_2)$, and the like, imide salts such as $LiN(SO_2CF_3)_2$, $LiN(C_lF_{2l+1}SO_2)(C_mF_{2m+1}SO_2)$ {l and m are each an integer of 1 or more}, and the like. These lithium salts may be used alone or as a mixture of a plurality of types. Among these, $LiPF_6$ is preferably used from the viewpoint of ion conductivity, electrochemical stability, etc. The concentration of the lithium salt is preferably 0.8 to 1.8 moles per liter of the nonaqueous solvent.

<Separator>

A porous sheet having ion permeability and insulation properties is used as the separator. Examples of the porous sheet include a microporous thin film, a woven fabric, a nonwoven fabric, and the like. Preferred examples of a material of the separator include olefin resins such as polyethylene, polypropylene, and the like, cellulose, and the like. The separator may be a laminate having a cellulose fiber layer and a thermoplastic resin fiber layer of an olefin resin or the like.

EXAMPLES

The present disclosure is described in further detail below by examples, but the present disclosure is not limited to these examples.

Example 1

[Production of Positive Electrode Active Material]

$[Ni_{0.51}Co_{0.23}Mn_{0.26}](OH)_2$ produced by a coprecipitation method was calcined to produce a transition metal oxide. The resultant transition metal oxide was mixed with $Li_2CO_3$, $WO_3$, and $LiBO_2$ by an Ishikawa-type grinding mortar so that the molar ratio between Li, the total amount of Ni, Co, and Mn, W, and B was 1.06:1:0.003:0.001. Then, the resultant mixture was fired at 950° C. for 10 hours in an air atmosphere and then ground to produce a lithium-nickel-manganese-cobalt composite oxide containing tungsten and boron.

Also, 1.76 g of lithium metaborate dihydrate was diluted to 75 ml by adding distilled water, preparing a coating solution. Then, the coating solution was sprayed by using a spray on 500 g of the lithium-nickel-manganese-cobalt composite oxide containing tungsten and boron while the composite oxide was stirred on a fluorine-coated tray by using a polypropylene spatula, followed by drying at 120° C. for 2 hours. The resultant powder was heat-treated at 300° C. for 5 hours in an air atmosphere to produce positive electrode active material particles. As a result of ICP measurement, the molar ratio between the total amount of nickel, cobalt, and manganese, tungsten, and boron in the resultant positive electrode active material was 1.00:0.003:0.005. This material was referred to as a "positive electrode active material A".

The resultant positive electrode active material A was washed with water for 20 minutes, and the amount of boron contained in water was measured by ICP. Also, the positive electrode active material was dissolved in hydrochloric acid, and the amount of boron contained in a solution was measured by ICP. These resultant values were regarded as the amount (referred to as the "surface boron amount" hereinafter) of boron present on the surfaces of secondary particles of the positive electrode active material and the amount (referred to as the "total boron amount" hereinafter) of boron present on the surfaces of and inside the secondary particles of the positive electrode active material. As a result of application of these values to a formula below, the ratio (referred to as the "inside boron ratio" hereinafter) of boron elements present inside the secondary particles to the total of boron elements present on the surfaces of and inside the secondary particles was 12% by mass.

Inside boron ratio (% by mass)=(1−(surface boron amount/total boron amount))×100

[Formation of Positive Electrode]

The positive electrode active material particles, carbon black serving as a conductive agent, and a N-methyl-2-pyrrolidone solution, which was prepared by dissolving polyvinylidene fluoride serving as a binder, were weighed so that the mass ratio between the positive electrode active material particles, the conductive agent, and the binder was 95:2.5:2.5. These were kneaded to prepare a positive electrode mixture slurry.

Next, the positive electrode mixture slurry was applied to both surfaces of a positive electrode current collector made of an aluminum foil, dried, and then rolled by using a rolling roller. Further, a current collector tab made of aluminum was attached, thereby forming a positive electrode in which positive electrode mixture layers were formed on both surfaces of the positive electrode current collector.

[Formation of Negative Electrode]

First, artificial graphite serving as a negative electrode active material, CMC (carboxymethyl cellulose sodium) serving as a dispersant, and SBR (styrene-butadiene rubber) serving as a binder were mixed at a mass ratio of 98:1:1 in an aqueous solution, preparing a negative electrode mixture slurry. Next, the negative electrode mixture slurry was uniformly applied to both surfaces of a negative electrode current collector made of a copper foil, dried, and then rolled by using a rolling roller. Thus, a negative electrode was formed, in which negative electrode mixture layers were formed on both surfaces of the negative electrode current collector.

[Preparation of Nonaqueous Electrolyte Solution]

A nonaqueous electrolyte solution was prepared by dissolving lithium hexafluorophosphate ($LiPF_6$) in a mixed solvent, which was prepared by mixing ethylene carbonate (EC), propylene carbonate (PC), and dimethyl carbonate (DMC) at a volume ratio of 25:5:70, so that the concentration was 1.2 moles/liter.

[Production of Battery]

Figure 2A:
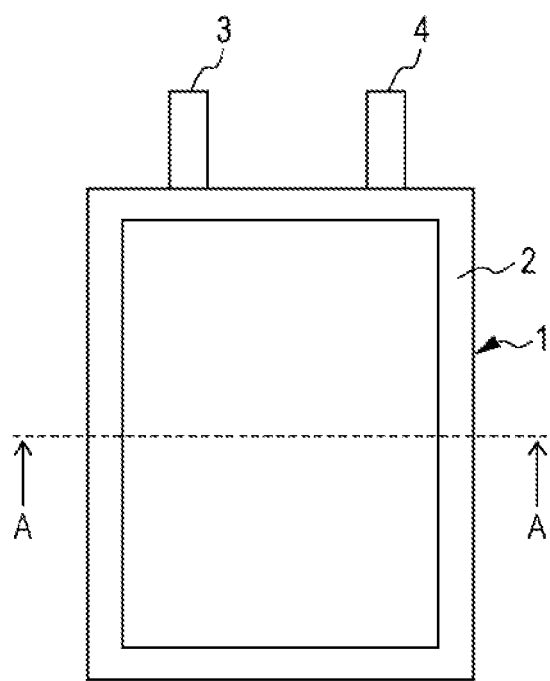
FIG. 2A is a schematic plan view of a nonaqueous electrolyte secondary battery used in an example.
Figure 2B:
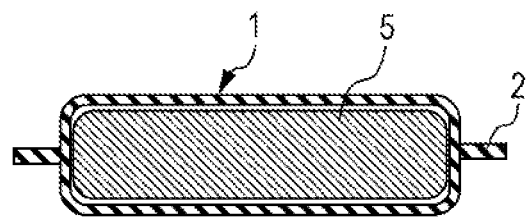
FIG. 2B is a drawing showing a section taken along a line A-A in FIG. 2A.

FIG. 2A is a schematic plane view of a nonaqueous electrolyte secondary battery used in the examples, and FIG. 2B is a drawing showing a section taken along line A-A in FIG. 2A. A positive electrode current collector tab 3 and a negative electrode current collector tab 4 were attached to the positive electrode and the negative electrode, respectively, formed as described above. A separator was disposed between both electrodes, these were wound in a spiral form, and then a winding core was removed to form a wound electrode assembly. Next, the wound electrode assembly was flattened to produce a flat-type electrode body 5. Then, the flat-type electrode body 5 and the nonaqueous electrolyte solution were disposed in an outer casing 1 made of an aluminum laminate, and a heat sheet opening 2 at a peripheral part of the aluminum laminate-made outer casing 1 is welded by heating to form a nonaqueous electrolyte secondary battery. The size of the nonaqueous electrolyte secondary battery was 3.6 mm×35 mm×62 mm, and when the nonaqueous electrolyte secondary battery was charged to 4.20 V and then discharged to 2.75 V, the discharge capacity was 550 mAh. The battery formed as described above is referred to as "battery A1".

Comparative Example 1

$[Ni_{0.51}Co_{0.23}Mn_{0.26}](OH)_2$ produced by a coprecipitation method was calcined to produce a transition metal oxide.

The resultant transition metal oxide was mixed with $Li_2CO_3$ by an Ishikawa-type grinding mortar so that the molar ratio between Li and the total amount of Ni, Co, and Mn was 1.06:1. Then, the resultant mixture was fired at 950° C. for 10 hours in an air atmosphere and then ground to produce a lithium-nickel-manganese-cobalt composite oxide. This material was referred to as a "positive electrode active material B1". In Comparative Example 1, a battery B1 was formed under the same conditions as in Example 1 except using the positive electrode active material B1.

Comparative Example 2

$[Ni_{0.51}Co_{0.23}Mn_{0.26}](OH)_2$ produced by a coprecipitation method was calcined to produce a transition metal oxide. The resultant transition metal oxide was mixed with $Li_2CO_3$ and $LiBO_2$ by an Ishikawa-type grinding mortar so that the molar ratio between Li, the total amount of Ni, Co, and Mn, and B was 1.06:1:0.001. Then, the resultant mixture was fired at 950° C. for 10 hours in an air atmosphere and then ground to produce a lithium-nickel-manganese-cobalt composite oxide containing boron.

Also, 1.76 g of lithium metaborate dihydrate was diluted to 75 ml by adding distilled water, preparing a coating solution. Then, the coating solution was sprayed by using a spray on 500 g of the lithium-nickel-manganese-cobalt composite oxide containing boron while the composite oxide was stirred on a fluorine-coated tray by using a polypropylene spatula, followed by drying at 120° C. for 2 hours. The resultant powder was heat-treated at 300° C. for 5 hours in an air atmosphere to produce positive electrode active material particles. As a result of ICP measurement, the molar ratio between the total amount of nickel, cobalt, and manganese and boron in the resultant positive electrode active material was 1:0.005. This material was referred to as a "positive electrode active material B2".

In addition, inside boron in the positive electrode active material B2 of Comparative Example 2 was determined by the same method as in Example 1. As a result, the inside boron was 12% by mass.

In Comparative Example 2, a battery B2 was formed under the same conditions as in Example 1 except using the positive electrode active material B2.

Comparative Example 3

$[Ni_{0.51}Co_{0.23}Mn_{0.26}](OH)_2$ produced by a coprecipitation method was calcined to produce a transition metal oxide. The resultant transition metal oxide was mixed with $Li_2CO_3$ and $WO_3$ by an Ishikawa-type grinding mortar so that the molar ratio between Li, the total amount of Ni, Co, and Mn, and W was 1.06:1:0.003. Then, the resultant mixture was fired at 950° C. for 10 hours in an air atmosphere and then ground to produce a lithium-nickel-manganese-cobalt composite oxide containing tungsten. This was referred to as "positive electrode active material B3". As a result of ICP measurement, the molar ratio between the total amount of nickel, cobalt, and manganese, and tungsten in the resultant positive electrode active material was 1.00:0.003.

In Comparative Example 3, a battery B3 was formed under the same conditions as in Example 1 except using the positive electrode active material B3.

Comparative Example 4

First, 1.76 g of lithium metaborate dihydrate was diluted to 75 ml by adding distilled water, preparing a coating solution. Then, the coating solution was sprayed by using a spray on 500 g of the positive electrode active material (B3) produced in Comparative Example 3 while the material was stirred on a fluorine-coated tray by using a polypropylene spatula, followed by drying at 120° C. for 2 hours. The resultant powder was heat-treated at 300° C. for 5 hours in an air atmosphere to produce positive electrode active material particles. As a result of ICP measurement, the molar ratio between the total amount of nickel, cobalt, and manganese, tungsten, and boron in the resultant positive electrode active material was 1.00:0.003:0.005. This material was referred to as a "positive electrode active material B4".

In addition, inside boron in the positive electrode active material B4 of Comparative Example 4 was determined by the same method as in Example 1. As a result, the inside boron was 0% by mass.

In Comparative Example 4, a battery B4 was formed under the same conditions as in Example 1 except using the positive electrode active material B4.

<High-Rate Charge-Discharge Test>

A charge-discharge test described below was performed by using each of the batteries A1 and B1 to B4 produced as described above. Constant-current charging was performed to 4.2 V with a constant current of 650 mA under the temperature condition of 25° C., and then constant-voltage charging was performed with a constant voltage of 4.2 V until the charging current was 13 mA. Next, constant-current discharging was performed to 2.75 V with a current of 650 mA under the temperature condition of 25° C. This was regarded as one cycle charge-discharge process and the charge-discharge process was repeated for 100 cycles.

<Evaluation of Input Characteristics after 100 Cycles>

After the repeated 100 charge-discharge cycles, each of the batteries A1 and B1 to B4 was constant-current charged to 4.2 V with a constant current of 650 mA under a temperature condition of 25° C., and during this charging, a charging capacity was measured. After the constant-current charging, each of the batteries was constant-voltage charged until the charging current was 13 mA with a constant voltage of 4.2 V, and during this charging, a charging capacity was measured. The measured charging capacity (CC charging capacity) of constant-current charging and the measured charging capacity (CV charging capacity) of constant-voltage charging were applied to a formula below, determining a rate of decrease in charging capacity. A lower rate of decrease in charging capacity determined by the formula below indicates that a decrease in input characteristics due to high-rate charge-discharge cycles is suppressed.

Rate of decrease in capacity (%)=CC charging capacity/(CC charging capacity+CV charging capacity)×100

Table 1 shows the rates of decease in capacity of the battery A1 (Example 1) and the batteries B1 to B4 (Comparative Examples 1 to 4).

TABLE 1

| Battery | W content (mol %) | B content (mol %) | Inside boron ratio (% by mass) | Rate of decrease in capacity after 100 cycles (%) |
|---|---|---|---|---|
| A1 | 0.30 | 0.50 | 12 | 0.18 |
| B1 | — | — | — | 1.80 |
| B2 | — | 0.50 | 12 | 1.54 |
| B3 | 0.30 | — | — | 1.73 |
| B4 | 0.30 | 0.50 | 0 | 1.83 |

The battery A1 using the positive electrode active material which contains a boron compound inside and on the surfaces of secondary particles of the lithium transition metal oxide containing Ni and W shows a lower capacity reduction rate as compared with the batteries B1 to B4 each using the lithium transition metal oxide not containing W or using the positive electrode active material which does not contain a boron compound inside and on the surfaces of secondary particles. From this result, it can be considered that the battery A1 can suppress a decrease in input characteristics due to high-rate charge-discharge cycles.

INDUSTRIAL APPLICABILITY

The present disclosure can be used for a positive electrode active material for a nonaqueous electrolyte secondary battery and used for a nonaqueous electrolyte secondary battery.

REFERENCE SIGNS LIST

1 outer casing
2 heat sheet opening
3 positive electrode current collector tab
4 negative electrode current collector tab
5 electrode body
10 positive electrode active material particle
20 primary particle
21 secondary particle
22a boron compound on surface of secondary particle
22b boron compound inside secondary particle

The invention claimed is:

1. A positive electrode active material for a secondary battery, comprising secondary particles which are produced by aggregation of primary particles of a lithium transition metal oxide containing Ni and W, and a boron compound present inside and on the surfaces of the secondary particles,
   the boron compound present on the surface of secondary particles is dispersed in the particle form of a primary particle or secondary particle on the surface of secondary particles, and
   the boron compound present inside the secondary particle is dispersed in the particle form of a primary particle or secondary particle in the secondary particle.

2. The positive electrode active material for a secondary battery according to claim 1, wherein the ratio of W in the lithium transition metal oxide is over 0 mol % and 1 mol % or less relative to the total molar amount of metal elements, excluding Li, in the lithium transition metal oxide.

3. The positive electrode active material for a secondary battery according to claim 1, wherein the ratio of boron elements inside the secondary particles is within a range of 5% by mass or more and 60% by mass or less relative to the total molar amount of born elements inside and on the surfaces of the secondary particles.

4. A secondary battery comprising a positive electrode including the positive electrode active material for a secondary battery according to claim 1.

* * * * *